(12) United States Patent
Rayner et al.

(10) Patent No.: US 7,696,647 B2
(45) Date of Patent: Apr. 13, 2010

(54) COUPLING NODE

(75) Inventors: Mark D Rayner, Houston, TX (US);
Rajesh Gopinath, Houston, TX (US);
Rahul Khopkar, Lubbock, TX (US)

(73) Assignee: Toshiba International Corp., Houston, TX (US)

( * ) Notice: Subject to any disclaimer, the term of this patent is extended or adjusted under 35 U.S.C. 154(b) by 350 days.

(21) Appl. No.: 10/941,026

(22) Filed: Sep. 15, 2004

(65) Prior Publication Data
US 2005/0083624 A1  Apr. 21, 2005

Related U.S. Application Data

(60) Provisional application No. 60/502,634, filed on Sep. 15, 2004.

(51) Int. Cl.
*H01H 83/00* (2006.01)
*H02H 7/08* (2006.01)
*H02H 3/00* (2006.01)

(52) U.S. Cl. .................. 307/125; 307/132 E; 307/143; 318/377; 318/378; 361/30; 361/64; 361/68; 361/78

(58) Field of Classification Search .............. 307/132 E, 307/143, 125; 361/30, 64, 68, 78; 318/377, 318/378
See application file for complete search history.

(56) References Cited

U.S. PATENT DOCUMENTS

| | | | | |
|---|---|---|---|---|
| 3,889,158 A | * | 6/1975 | Peterson | 361/16 |
| 5,283,706 A | * | 2/1994 | Lillemo et al. | 361/3 |
| 6,324,039 B1 | * | 11/2001 | Gross, Jr. | 361/86 |
| 6,356,422 B1 | * | 3/2002 | Bilac et al. | 361/93.1 |
| 6,552,505 B2 | * | 4/2003 | Naito | 318/63 |
| 2003/0090225 A1 | * | 5/2003 | Posma et al. | 318/376 |
| 2005/0062437 A1 | * | 3/2005 | Numeroli et al. | 315/247 |

OTHER PUBLICATIONS

"AD202 Low Cost, Miniature Isolation Amplifier Powered Directly From a +15 V DC Supply", http://www.analog.com/en/prod/0759_783_AD202,00.html (1995-2006).*
"Other Current-Sensing Technologies", Handbook of Small Electric Motors, Yeadon, W. H. and A. W., (eds.), Chapter 10, Section 10.9.6, pp. 10.92-10.93, McGraw-Hill (2001).*

* cited by examiner

*Primary Examiner*—Albert W Paladini
*Assistant Examiner*—Hal I Kaplan
(74) *Attorney, Agent, or Firm*—Banner & Witcoff, Ltd (57) ABSTRACT

A coupling node for regulating the current flow between two or more drives is described. The coupling node may include an interconnect circuit in communication with the drives for selectively opening the connection between the drives. A sensor circuit in communication with the drives measures one or more electrical properties of the drives or between the drives. A sensor circuit actuates the interconnect circuit in response to the measured electrical property of the two or more drives meeting predetermined criteria. In operation, when an electrical property of the drives, such as the current flowing between the drives, meets a predetermined criteria, such as an short circuit or current overload, as indicated by the sensor circuit, the controller actuates the interconnect circuit to open the connection between the drives.

23 Claims, 13 Drawing Sheets

COUPLING NODE

RELATED APPLICATION INFORMATION

This application claims priority to U.S. Ser. No. 60/502,634, filed Sep. 15, 2004, entitled "Coupling Node", whose contents are expressly incorporated herein by reference.

FIELD OF THE INVENTION

Aspects of the invention relate to regulating current in a circuit and more specifically to couplings for regulating the flow of current between two or more drives.

BACKGROUND OF THE INVENTION

The use of drives is common in control systems. In many cases it is beneficial to connect multiple drives to a common DC bus. When connected in this manner power can flow freely between the drives. Thus if one drive is in regeneration, it can supply power back to the DC bus. If the other drive is consuming power, the regenerating drive can supply the consuming drive with power thereby reducing energy consumption. Unfortunately, this configuration can also cause problems. If current flowing between drives is not limited, excessive stress can be placed on components receiving power from one or more of the drives via the DC bus. This often results in blown fuses or damaged components. Replacing such components incurs additional cost, not only in the cost to replace, but also in the down time of the system while components are replaced.

Therefore, what is needed is a way to protect the components from excessive current and the resulting damage the current may cause while also optimizing the flow of current and power consumption of the system. Other advantages will be apparent to those skilled in the art in view of the following disclosure of the invention and detailed description of embodiments.

SUMMARY

Aspects of the invention address one or more of the issues described above, thereby allowing two or more drives to be safely connected to a DC bus.

In accordance with some aspects of the present invention, a coupling node for regulating the current flow between two or more drives includes an interconnect circuit in communication with the two or more drives for selectively opening the connection between the two or more drives, a sensor circuit in communication with the two or more drives for measuring an electrical property of the two or more drives, and a controller in communication with the interconnect circuit and sensor circuit for actuating the interconnect circuit in response to the measured electrical property of the two or more drives meeting predetermined criteria. In some aspects, the interconnect circuit includes a bi-directional switch. In other embodiments, the interconnect circuit includes a contactor and a relay in communication with the contactor.

In accordance with other aspects of the present invention, methods of regulating the flow of current between two or more drives include monitoring an electrical property of the two or more connected drives and opening the connection between the drives when the measured electrical property meets a predetermined criterion or criteria. The methods may further include closing the connection between the two or more drives when an additional criterion or criteria is met.

These and additional features and advantages of the invention disclosed here will be further understood from the following description.

The figures referred to above should be understood to present a representation of the invention, illustrative of the principles involved. The coupling node as disclosed herein will have configurations and components determined, in part, by the intended application and environment in which they are used.

DETAILED DESCRIPTION OF EMBODIMENTS

It is noted that various connections are set forth between elements in the following description. It is noted that these connections in general and, unless specified otherwise, may be direct or indirect and that this specification is not intended to be limiting in this respect.

Figure 1:
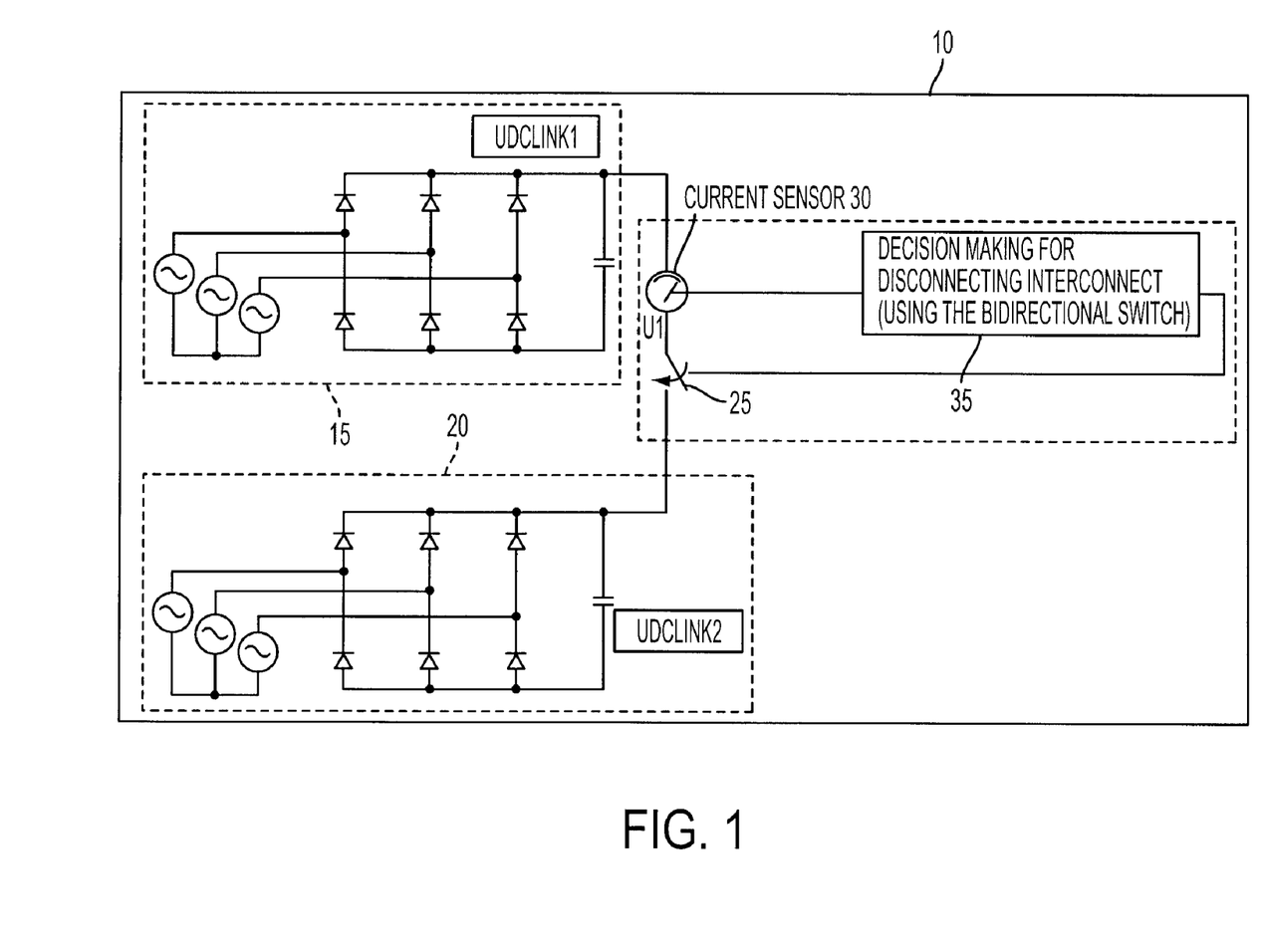
FIG. 1 is a circuit diagram showing a diagram of a coupling node in accordance with aspects of the present invention.

An illustrative diagram of a coupling node in use with two drives is shown in FIG. 1. The embodiment shown here features two drives 15, 20 (only the rectifier portion is shown in this representation) coupled to each other through a coupling node 10. Examples of suitable drives include, but are not limited to voltage or current source drives. The coupling node 10 includes an interconnect circuit 25, a sensor circuit 30, and a controller 35.

The interconnect circuit 25 serves to connect the two or more drives so as to allow current to flow between the two drives 15, 20. FIG. 1 shows two drives connected. Additional drives may possibly be connected using the interconnect circuit 25 using known configurations including but not limited to a delta connection, a wye connection, and variations thereon.

The interconnect circuit 25 also serves to selectively open the connection between the drives 15, 20 so that current is not able to flow between the drives 15, 20. The interconnect circuit 25 may also re-establish the connection between the drives 15, 20. In one illustrative example, the interconnect circuit 25 may be a bi-directional switch U1. Examples of suitable bi-directional semiconductor switches include, but are not limited to paired Insulated Gate Bipolar Transistors (IGBT's) and Bipolar Junction Transistors (BJT's). In another illustrative example, the interconnect circuit 25 may include a contactor.

The sensor circuit 30 may monitor the electrical properties of the circuit. One illustrative example of the sensor circuit 30, such as that shown in FIG. 1, may include a current sensor. In some illustrative examples, the current sensor is a Hall Current Sensor. In other illustrative examples, the current sensor is implemented using isolation devices such as AD202JN or HCPL-7800. In some illustrative examples, the sensor circuit 30 may further include one or more voltage sensors for measuring the link voltages of the drives 15, 20 VDC LINK1, VDC LINK2. The voltage sensing operations can be accomplished by using isolation devices such as AD202JN or HCPL-7800 and other known circuits and techniques. In some aspects, the output of the sensor circuit may be scaled to work with TTL logic. In other aspects, other types of logic may be used, thereby modifying the required output of the sensor circuit.

Figure 2:
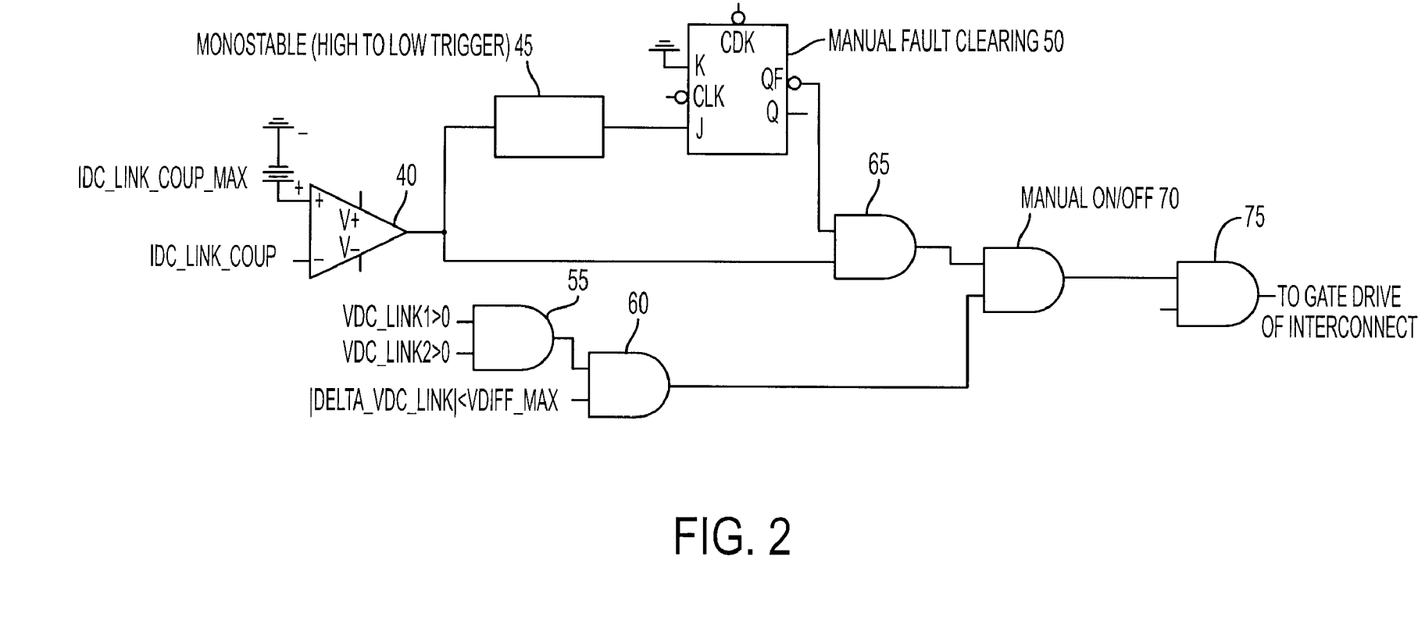
FIG. 2 is a circuit diagram showing an illustrative example of the controller of the coupling node.

The controller 35 is in communication with the interconnect circuit 25 and sensor circuit 30. As used here the term communication refers to any electrical communication including but not limited to wired, optical or wireless communication, or the like. When the output of the sensor circuit 30 meets certain predetermined criteria, the controller 35 actuates the interconnect circuit 25 to open the connection between the drives 15, 20. The controller 35 may also function to close the connection when other criteria are met. One illustrative example of the controller can be seen in FIG. 2. In this illustrative example, the controller may include an op-amp 40, a monostable 45 in communication the op-amp 40, a JK flip flop 50 in communication with the monostable 45, a first AND gate 55, a second AND gate 60 in communication with the first AND gate 55, a third AND gate 65 in communication with the JK flip flop 50 and op-amp 40, a fourth AND gate 70 in communication with the second and third AND gates 60, 65 and a fifth AND gate 75 in communication with the fourth AND gate 70. Op-amp 40 compares a predetermined max current level IDC_LINK_COUP_MAX with an actual current level IDC_LINK_COUP and outputs the comparison to monostable circuit 45 and AND gate 65. The monostable circuit 45 sends a pulse or other waveform to JK flip-flop 50 where manual fault clearing may be performed. The output of the JK flip-flop 50 is combined with the output of the current comparison in op-amp 40. AND gates 55 and 60 ensure that the voltage from both drives is greater than 0 (VDC_LINK1>0 and VDC_LINK2>0) and that the difference DELTA_VDC_LINK between the two voltages is less than a maximum difference VDIFF_MAX. The result of AND gates 55 and 60 is combined with the output of AND gate 65 at AND gate 70. The result of AND gate 70 is combined with a manual on/off signal in AND gate 75, whose output is connected (directly or indirectly) to the interconnect circuit 25. It is appreciated that AND gate logic is merely an example of different logic systems that may be applied as is known in the art.

Figure 3:
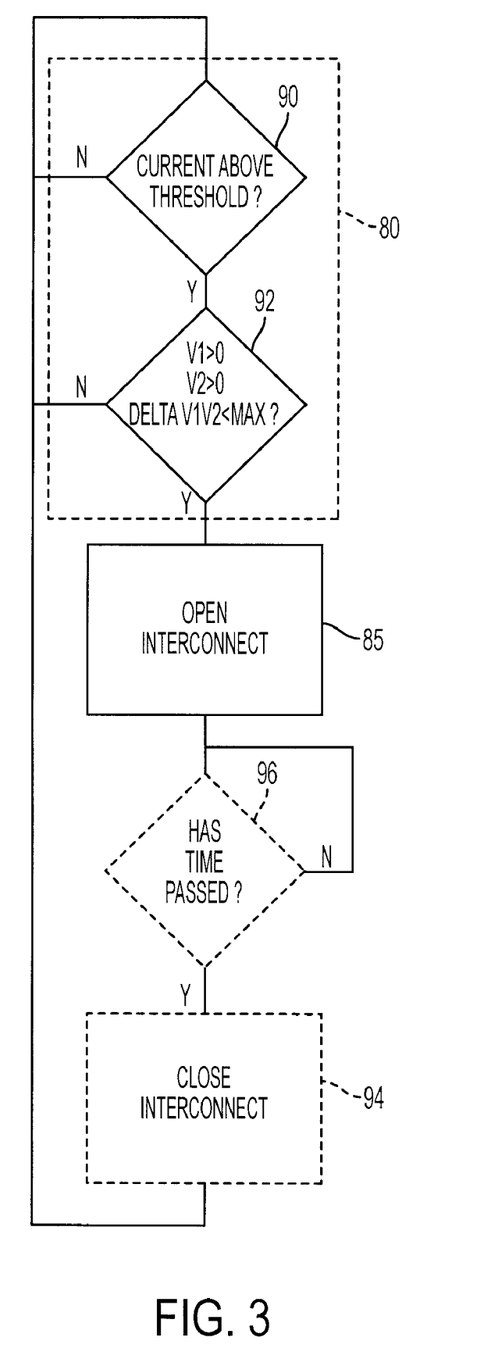
FIG. 3 is a flow diagram showing illustrative examples of methods for controlling current flow in accordance with aspects of the present invention.

In accordance with another illustrative example as shown in FIG. 3, methods for regulating the flow of current between two or more drives are described. The methods include monitoring 80 an electrical property of the two or more connected drives and opening 85 the connection between the drives when the monitored electrical property or properties (voltage, current, changes in either or both, or some combination of these) meet a predetermined criterion or criteria. In some illustrative examples, the electrical property monitored is the current flowing between the drives and the predetermined criterion is a current level as shown in step 90. Other electrical properties that may be monitored include link voltages V1 (VDC_LINK1), V2 (VDC_L1NK2), DELTA_V1V2<MAX of the drives as shown in step 92. If the current and/or voltages were within the criterion or criteria of step 80, the connection would remain closed. If the current or voltages exceeded the criteria or criterion, then the connection would open in step 85. The predetermined criterion or criteria may include but are not limited to voltage level or voltage differential between the link voltages. The methods may further include closing the connection (as per step 94) between the two or more drives when a further criterion or criteria are met. A further criterion or criteria may include a predetermined time period as shown in step 96 or a manual or automatic reconnect signal (that may be used in place of step 96).

Figure 4:
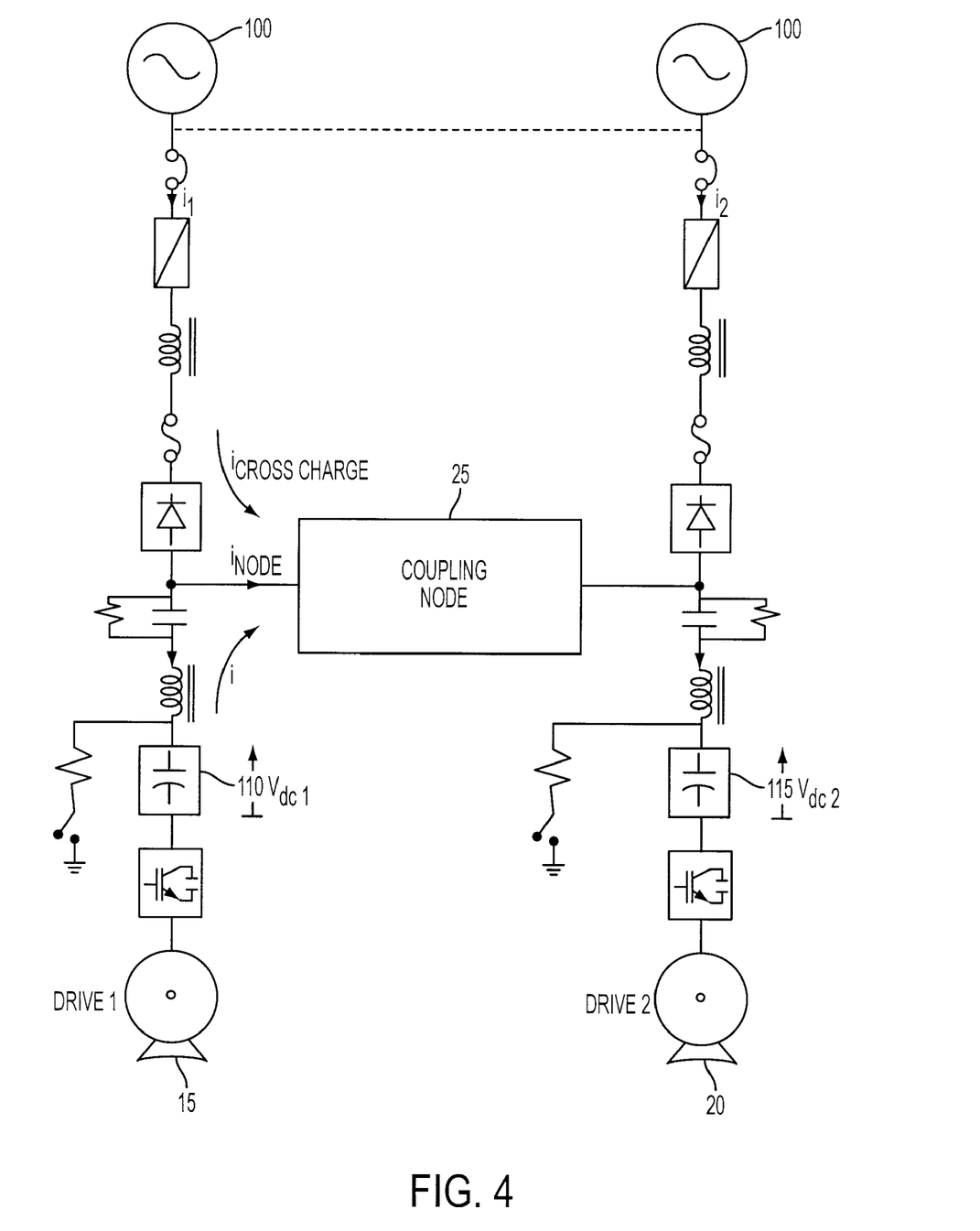
FIG. 4 is circuit diagram of an illustrative example of the coupling node used in connection with two drives in accordance with aspects of the present invention.

An illustrative example of a coupling node is shown in FIG. 4. A circuit is shown with two drives 15, 20 in communication with a power supply 100 (or power supplies 100) and interconnected to each other through a coupling node 25. The first drive 15 is in regeneration mode allowing the second drive 20 to receive current i2 from the power supply 100 as well as current i from the regenerating drive 15, which passes through the coupling node 25 to the second drive 20 inode (=icross-charge+i).

In reference to FIG. 4, in operation, at startup, the DC link voltages of both drives are zero, the interconnect circuit 25 is opened, and the DC link capacitors 110, 115 of the respective drives are charged up. As the DC links are charged, the interconnect circuit 25 (also referred to herein as the "coupling node 25") is closed. As long as the current $1_{node}$ is flowing between the drives 15, 20 and the difference between the DC link voltages of the drives 15, 20 is below a predetermined value or set of values DELTA_V1V2<VDIFF<MAX, the interconnect circuit 25 remains closed. If there is a short circuit in the second drive 20, the current flowing from the first drive 15 to the second drive 20 will rise rapidly and exceed a predetermined value as the DC link voltage of the second drive 20 goes to zero. The interconnect circuit 25 is then opened. The interconnect circuit 25 remains open until cleared (automatically or manually) or restarted. Alternatively, the interconnect circuit 25 may close when a fixed amount of time passes as determined by a monostable as shown in FIG. 3. If the short circuit is removed, then the DC link voltage of the second drive 20 will begin to rise. When the difference between the DC link voltages of the drives 15, 20 is once again below a predetermined value, the interconnect circuit 25 may be closed. The coupling node 10 also operates in the same manner when the second drive 20 is regenerating and the first drive 15 is being powered, which includes first drive 15 receiving current $i_1$ from power supply 100.

Figure 5:
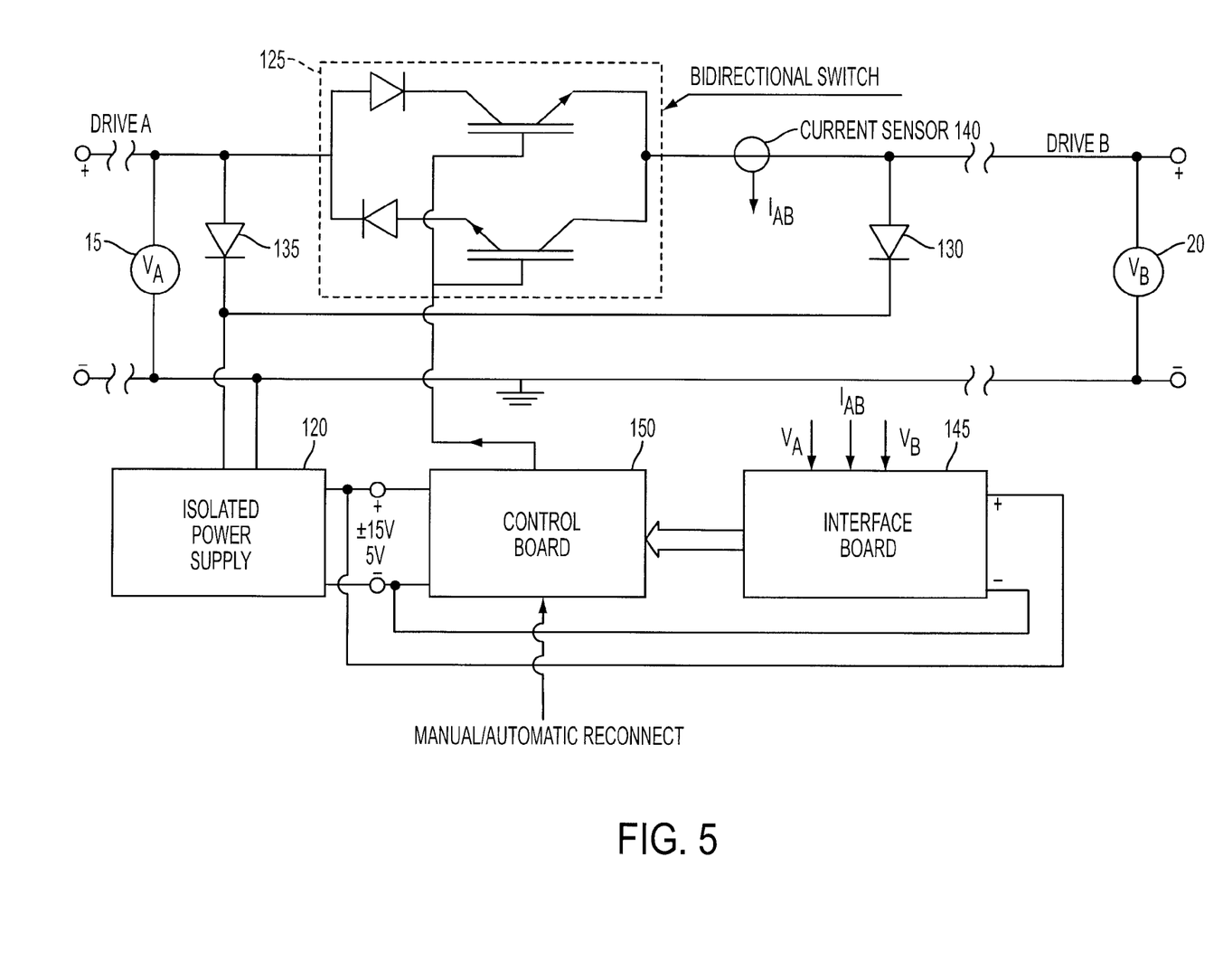
FIG. 5 is a circuit diagram showing an illustrative example of the coupling node using a bi-directional switch in accordance with aspects of the present invention.

In some aspects of the present invention, the interconnect circuit 25 may include a bi-directional switch, as shown in FIG. 5. Here, the first and second drives 15, 20 are connected to an isolated power supply 120 and each other through a bi-directional switch 125. An example of a suitable bi-directional switch is a switch module MIG300J2CSB1W. Diodes 130, 135 may be used to prevent current from flowing in the wrong direction. An example of a suitable diode is diode module DD60HB160. A current sensor 140 may be placed in series with the bi-directional switch 125 to monitor current $I_{AB}$ (the output referred to as the over current for the inverter OC_INV) flowing between the drives 15, 20. Voltage is measured across the first and second drives 15, 20 $V_A$, $V_B$. Here, the outputs of the sensors are input to an interface board 145 in order to scale the outputs to TTL levels as used by the controller 150. The controller 150 receives the measurements of the sensors from the interface board 145 and actuates the bi-directional switch 125 accordingly.

In some aspects, the voltage sensing can be accomplished by using an isolation device 155 such as AD202JN or HCPL-7840 isolation amplifiers. One embodiment of a implementing the voltage sensor can be seen in FIG. 6.

In some embodiments the current sensor is a Hall Current Sensor. One embodiment of implementing the current sensor can be seen in FIG. 7. In other embodiments the current sensor is implemented using isolation devices such as AD202JN or HCPL-7800 isolation amplifiers.

Figure 8:
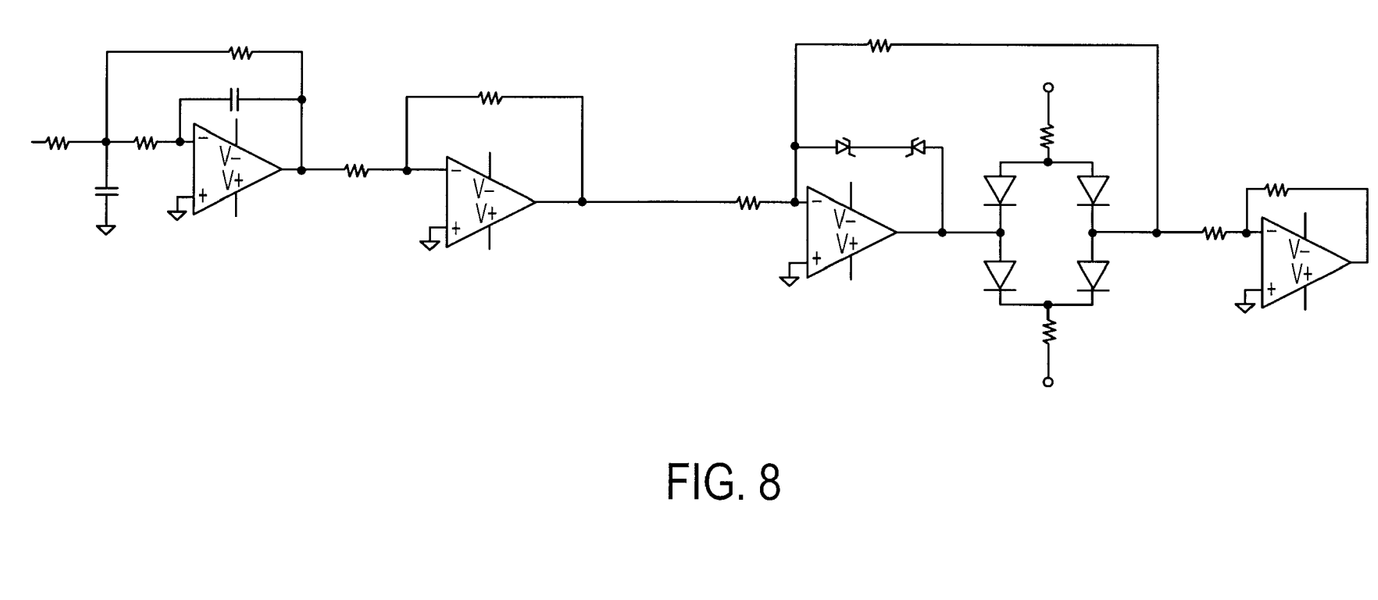
FIG. 8 is a circuit diagram showing another illustrative example of a current sensor in accordance with aspects of the present invention.

Another embodiment of a current sensor can be seen in FIG. 8. Here the output is filtered and clamped to predetermined voltage, such as 3.3 volts for CMOS logic and 5 volts for TTL logic. Of course, other logic levels may be used as appropriate for other logic types.

It should be understood that these examples are provided for illustrative purposes only. They are but a few of the many possible configurations. The values and specific components named or suggested may be changed or replaced depending on application or availability of components. Other embodiments and configurations will be apparent to one skilled in the art given the benefit of this disclosure.

For illustrative purposes, the following example is provided of a coupling node for use with two 20 HP, 460V (VT130G7U4220) drives on a common DC bus using a bi-directional switch. An embodiment of the controller for use with this example can be seen in FIG. 9. This controller is similar to the controller show in FIG. 2 as described above. In this example a Single Pole Double Throw (SPDT) switch 210 can be used to activate or deactivate the interconnect circuit 25. This example also allows the automatic or manual closing after the circuit trips due to a fault. To set to automatic operation, the "K" of the JK flip flop 220 is set high by connecting the K input (via switch 225) to the logic high and switch 215 (that connects the K input to ground or low) is opened. For manual operation the K input (via switch 215) is set to logic low and switch 225 is opened.

Figure 9:
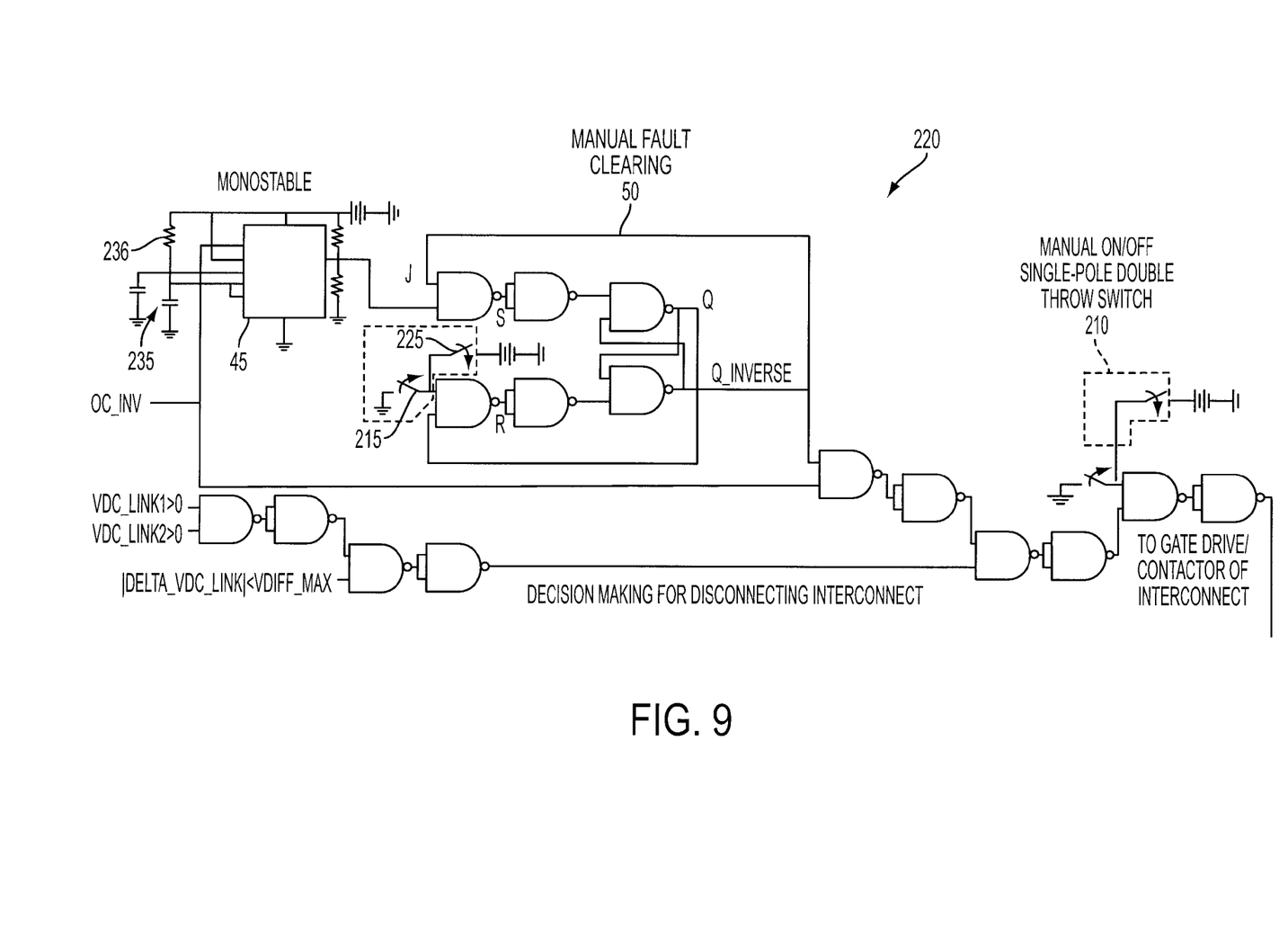
FIG. 9 is a circuit diagram showing another illustrative example of the controller for use with a bi-directional switch in accordance with aspects of the present invention.

The amount of time the interconnect circuit 25 remains open is decided by the time constant (τ) of the monostable 45. This can be adjusted in accordance with the expression.

$$\tau = 1.1 * RC$$

In the example, the interconnect circuit 25 may be kept open by the monostable circuit for a period of 100 ms corresponding to six 60 Hz cycles of input line voltage. The value of R 236 may be chosen to be 10 mega ohms in order to give the value of the capacitor C 235 a reasonable range.

Figure 6:
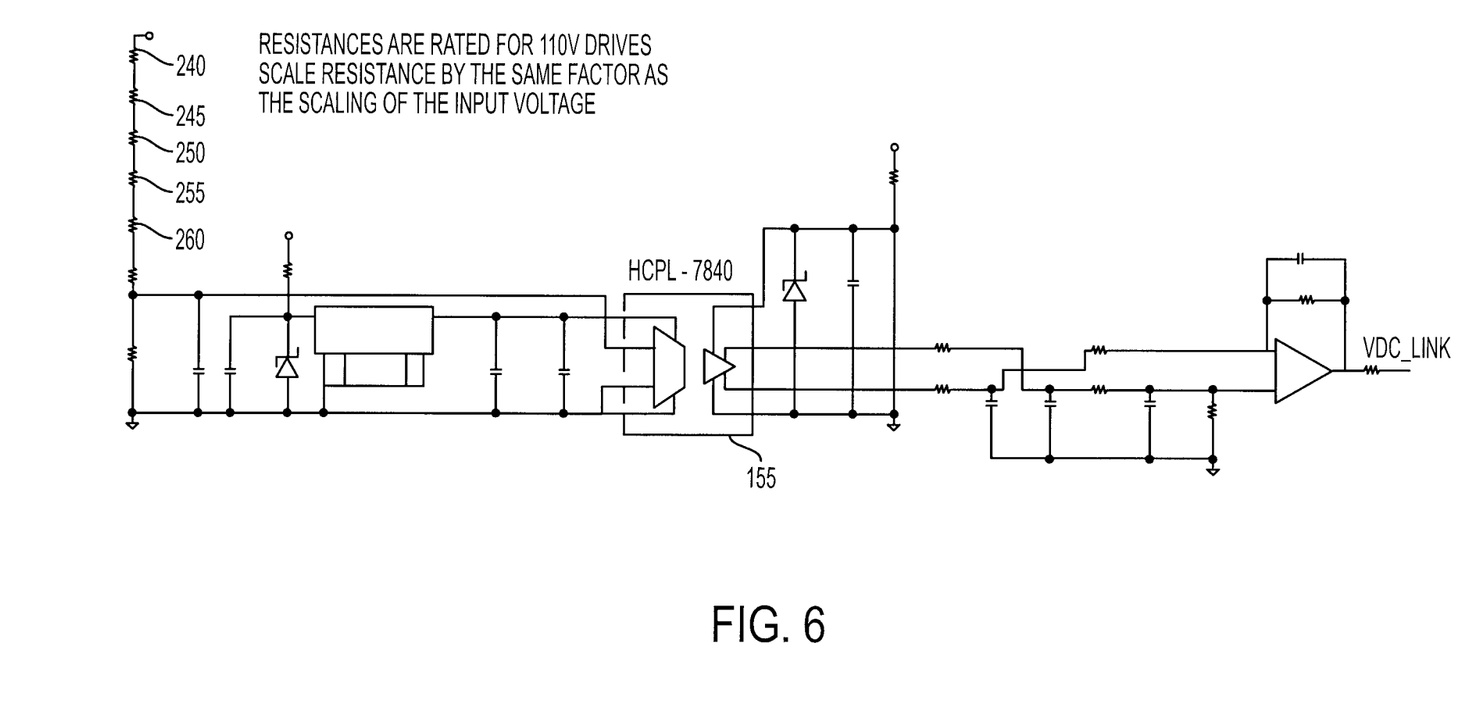
FIG. 6 is a circuit diagram showing an illustrative example of a voltage sensor in accordance with aspects of the present invention.
Figure 7:
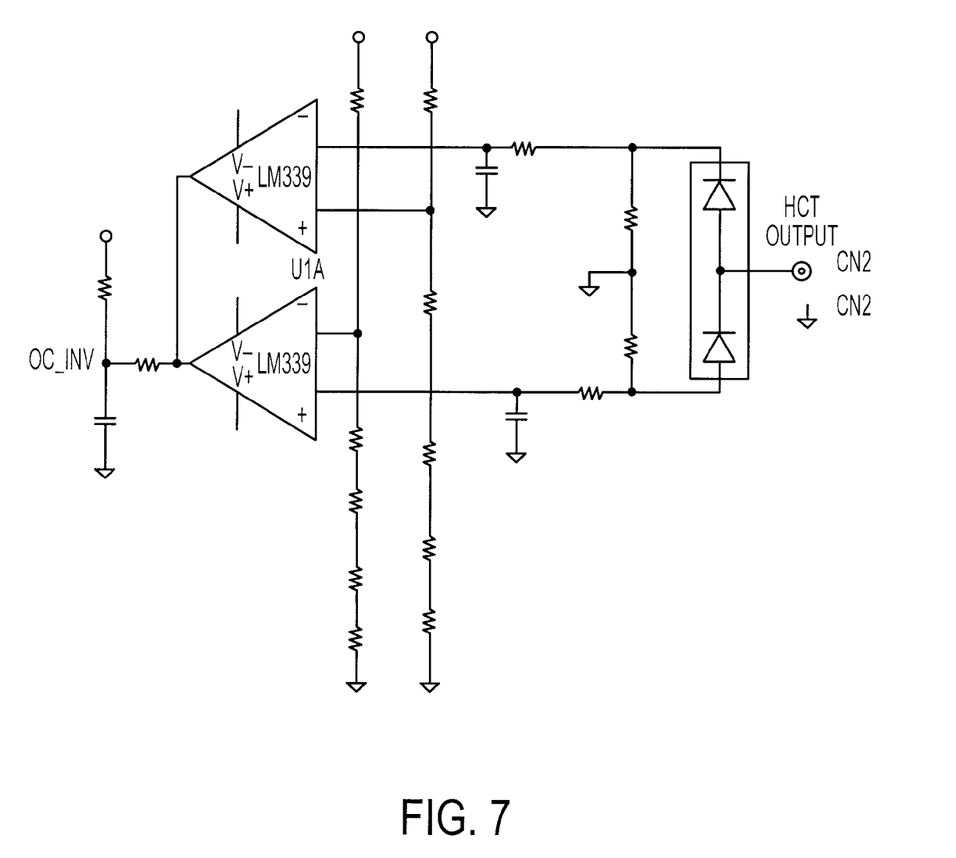
FIG. 7 is a circuit diagram showing an illustrative example of a current sensor in accordance with aspects of the present invention.

This example uses the voltage sensor as depicted in FIG. 6 with the values of R124-R128 240, 245, 250, 255 and 260 chosen to be 1.328 kilo-ohms. The current sensor shown in FIG. 7 is also used in this example. The maximum current level may be set below the inverse time curve for the rectifier fuse of a drive such that the interconnect circuit 25 opens the connection between drives before the rectifier fuse of either drive blows off. In this example, the maximum current level for the current sensor is set to 12 V. This corresponds to 300% of the nominal Hall Current Transducer (HCT) rating.

Figure 10:
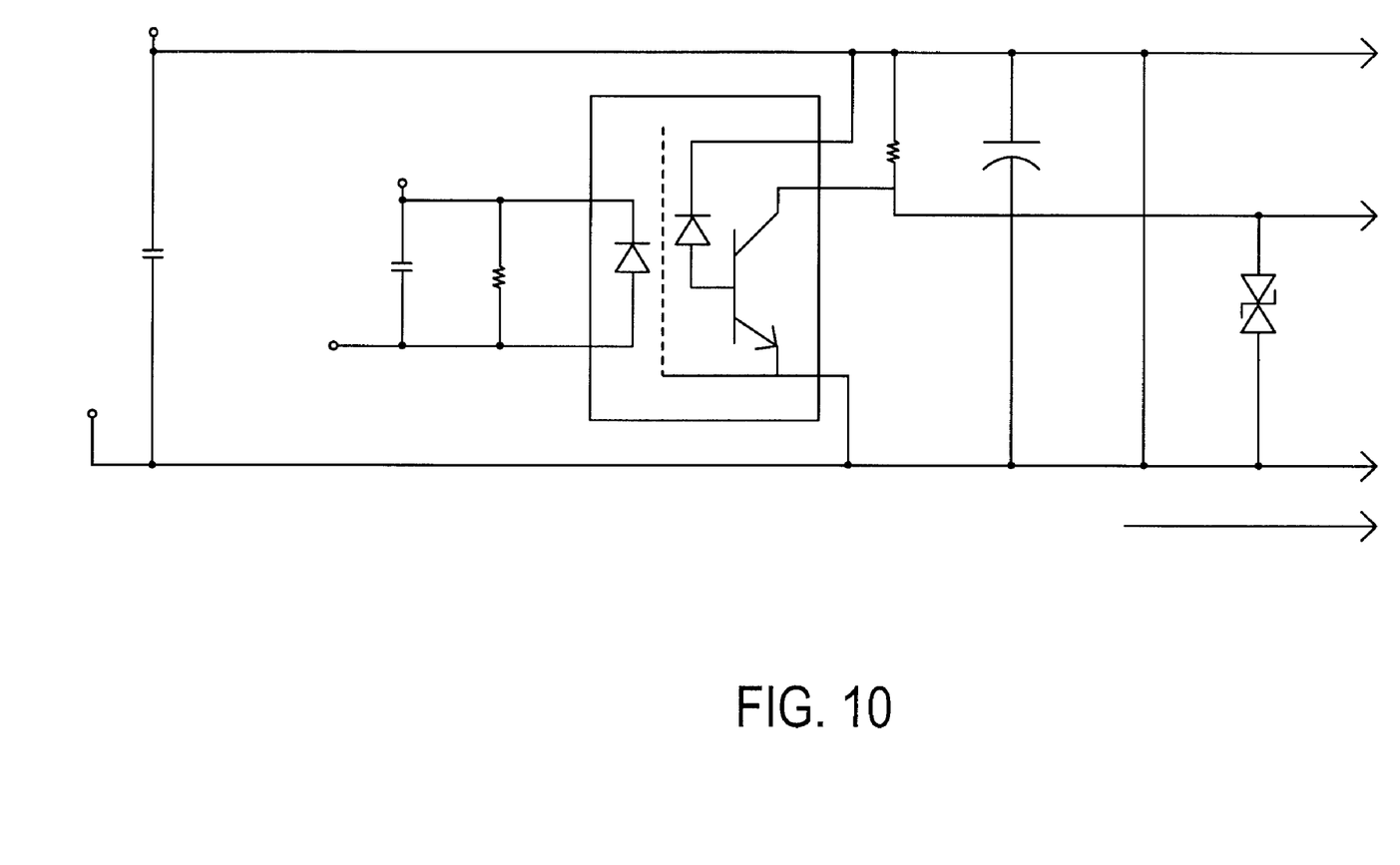
FIG. 10 is a circuit diagram showing an optically isolated gate driver in accordance with aspects of the present invention.
Figure 11:
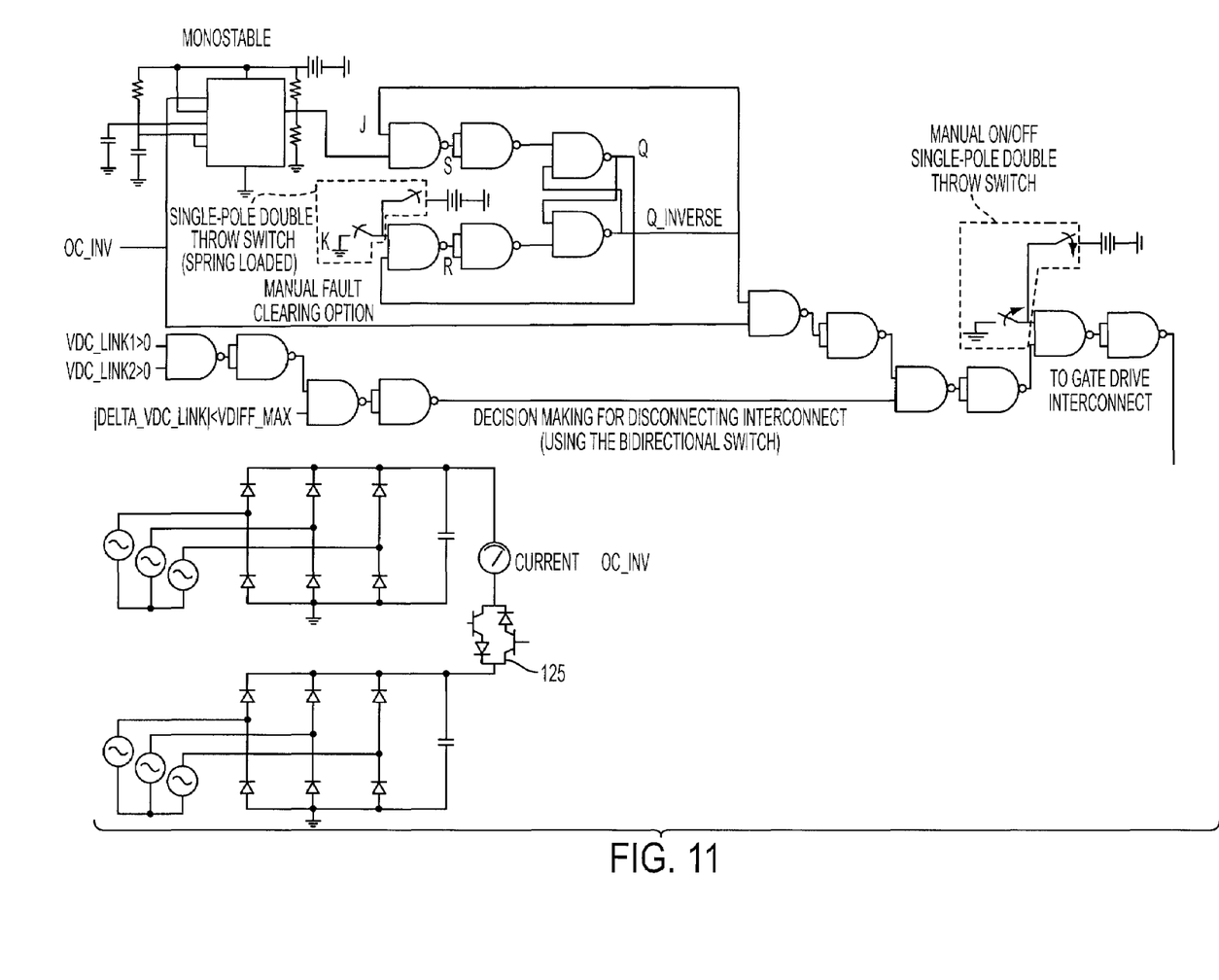
FIG. 11 is a circuit diagram showing an illustrative example of the coupling node using a bi-directional switch in accordance with aspects of the present invention.

The bi-directional switch may safely be able to handle 300% of the rated current of the smaller drive; therefore, each of the switches may be rated for 600% of the full load current of the smaller of the two drives. The voltage rating of each switch is 200% of the DC link bus rating. The bi-directional switch used in this example is MIG300J2CSB1W switch module. An optically isolated gate driver as show in FIG. 10 may be used to link the bi-directional switch to the controller. A schematic showing the overall system using a bi-directional switch 125 can be seen FIG. 11. Here, one may use part number MIG300J**** or Q2N2222 (or other similar components) as the bi-directional switch.

Figure 12:
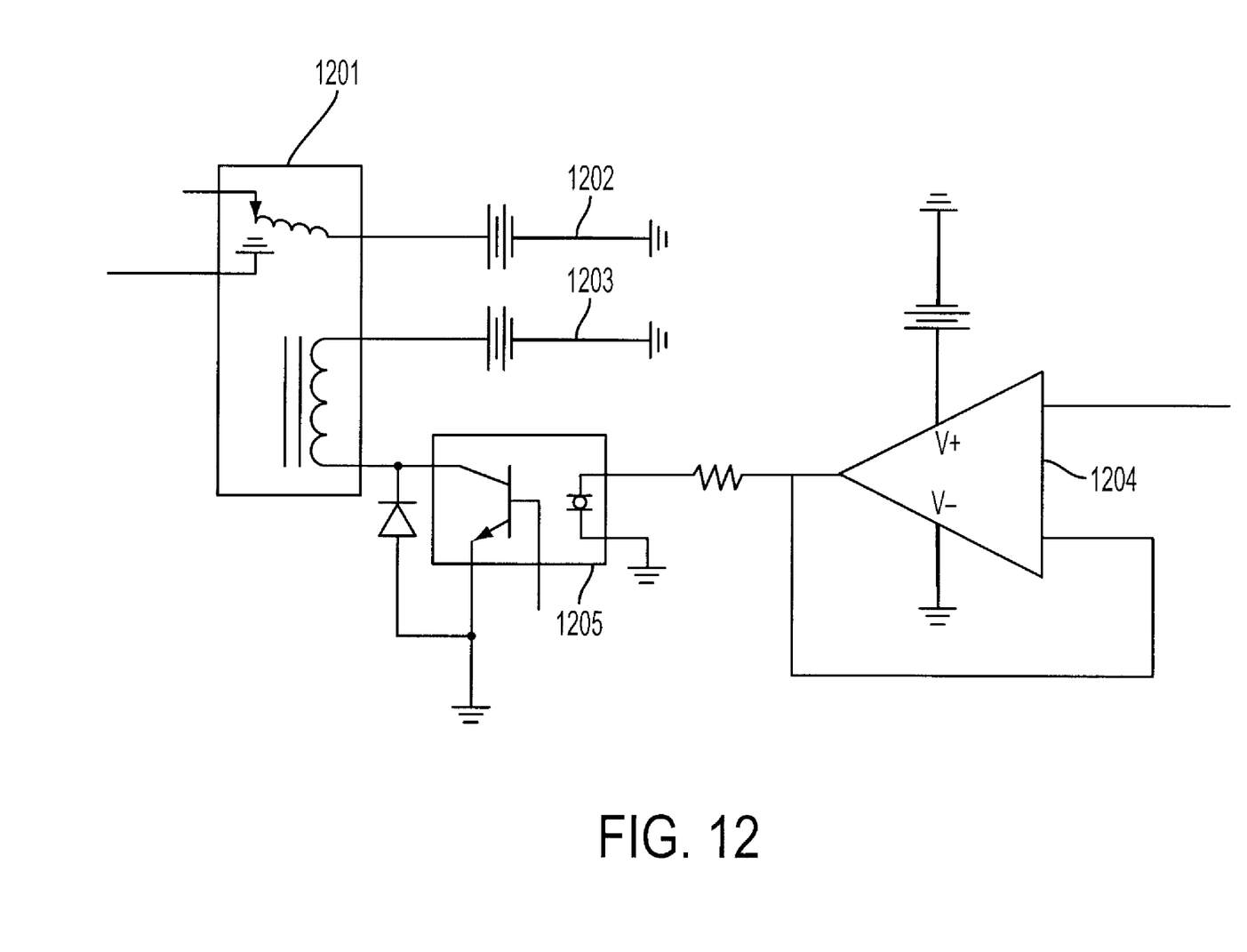
FIG. 12 is a circuit diagram showing an illustrative example of a circuit for driving a relay for use in examples using a contactor and relay in accordance with aspects of the present invention.
Figure 13:
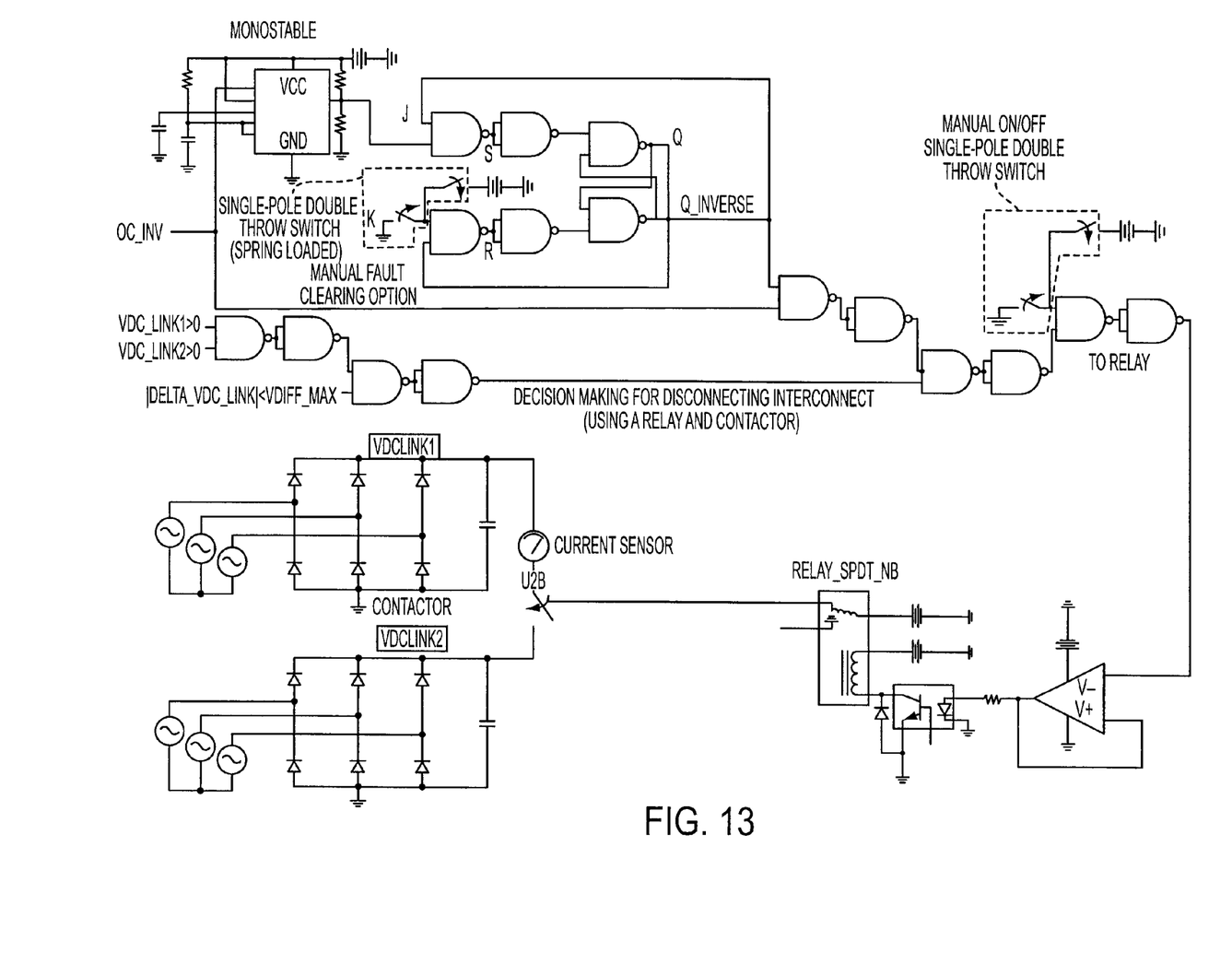
FIG. 13 is a circuit diagram showing an illustrative example of the coupling node using a contactor in accordance with aspects of the present invention.

In another embodiment of the example given above, a contactor and relay are used as an interconnect circuit 25. The circuit is similar as described above but with a relay and contactor replacing the bi-directional switch and related optically isolated gate drive. A suitable circuit for diving the relay can bee seen in FIG. 12 with relay 1201, power supplies 1202-1203, op-amp 1204, and optical switch 1205 (or contactor). A schematic of the overall system using a contactor and relay is shown in FIG. 13. Here, one may use part number TLP521-1 OptoCoupler or A4N25 (or other similar components) as the contactor.

While the invention has been described with respect to specific examples including modes of carrying out the invention, those skilled in the art will appreciate that there are numerous variations and permutations of the above described systems and techniques that fall within the spirit and scope of the invention as set forth in the appended claims.

What is claimed is:

1. A coupling node comprising:
   an interconnect circuit coupled to two or more drives and configured to allow current to flow from a first one of said drives to a second one of said drives;
   a sensor circuit in communication with the two or more drives configured to measure an electrical property of the two or more drives; and
   a controller in communication with the interconnect circuit and sensor circuit configured to cause the interconnect circuit to interrupt the current flowing from the first one of said drives to the second one of said drives, in response to the measured electrical property of the two or more drives meeting at least one predetermined criterion, wherein the controller is further configured to open an electrical connection to prevent current flow between said drives during a startup operation of said drives, and wherein said interconnect circuit allows said current to flow from the first one of said drives to the second one of said drives after respective DC link capacitors of said drives have charged up from said startup operation.

2. The coupling node of claim 1, wherein the interconnect circuit may selectively close the connection between the two or more drives.

3. The coupling node of claim 1, wherein the interconnect circuit closes the connection between the two or more drives after the connection has been opened for a predetermined time.

4. The coupling node of claim 1, wherein the interconnect circuit comprises a bi-directional switch.

5. The coupling node of claim 1, wherein the interconnect circuit comprises:
   a contactor; and
   a relay in communication with the contactor.

6. The coupling node of claim 1, wherein the sensor circuit comprises a current sensor for measuring the current flowing between the two or more drives.

7. The coupling node of claim 6, wherein the current sensor comprises a Hall Current Sensor.

8. The coupling node of claim 6, wherein the current sensor comprises an isolation device.

9. The coupling node of claim 6, wherein the controller actuates the interconnect circuit when the measured current flowing between the two or more drives exceeds predetermined maximum current.

10. The coupling node of claim 6, wherein the sensor circuit further comprises:
    a first voltage sensor for measuring a link voltage of the first drive; and
    a second voltage sensor for measuring a link voltage of the second drive.

11. The coupling node of claim 10, wherein the first voltage sensor comprises an isolation device and the second voltage sensor comprises an isolation device.

12. A drive method comprising:
    closing an electrical connection between two drives to allow current to flow between the drives through the electrical connection;
    monitoring an electrical property of the drives; and
    opening the connection when the measured electrical property meets at least one predetermined criterion, wherein either:
    a) the electrical property being monitored comprises the current flowing between the two or more drives, and the predetermined criterion comprises a maximum current level; or
    b) the electrical property being monitored comprises link voltages of the two or more drives.

13. The method of claim 12, wherein the electrical property being monitored comprises the current flowing between the two or more drives, and the predetermined criterion comprises a maximum current level.

14. The method of claim 12, wherein the electrical property being monitored comprises link voltages of the two or more drives.

15. The method of claim 14, wherein the predetermined criterion comprises a link voltage of zero.

16. The method of claim 14, wherein the predetermined criterion comprises a difference in link voltages of the two or more drives greater than a predetermined level.

17. The method of claim 12, further comprising closing the connection between the two or more drives when an additional predetermined criterion is met.

18. The method of claim 17, wherein the additional predetermined criterion is the connection having been open for a predetermined time.

19. The drive method of claim 12, further comprising the following:
    opening said electrical connection during a startup operation of said drives, wherein said closing is performed after respective DC link capacitors of said drives have charged up from said startup operation.

20. A coupling node comprising:
    an interconnect circuit configured to selectively connect two or more drives to allow a first drive, when in a regeneration mode, to share power with a second drive, and when in a power consumption mode, to open said connection;
    a current sensor configured to measure a current flow between the two or more drives and generate a first output in response;
    a first voltage sensor configured to measure a link voltage of the first drive and generate a second output in response;
    a second voltage sensor configured to measure a link voltage of the second drive and generating a third output in response; and
    a controller in communication with the interconnect circuit, current sensor, and first and second voltage sensors configured to actuate the interconnect circuit in response to the first, second and third outputs.

21. The coupling node of claim 20, wherein the interconnect circuit comprises a bi-directional switch.

22. The coupling node of claim 20, wherein the interconnect circuit comprises:
    a contactor; and
    a relay in communication with the contactor.

23. The coupling node of claim 20, wherein the controller is further configured to:
    open an electrical connection to prevent current flow between said drives during a startup operation of said drives, wherein said interconnect circuit allows said drives to share power after respective DC link capacitors of said drives have charged up from said startup operation.

* * * * *